(No Model.)
B. C. H. SIMPSON.
VEHICLE HUB.
No. 368,358. Patented Aug. 16, 1887.
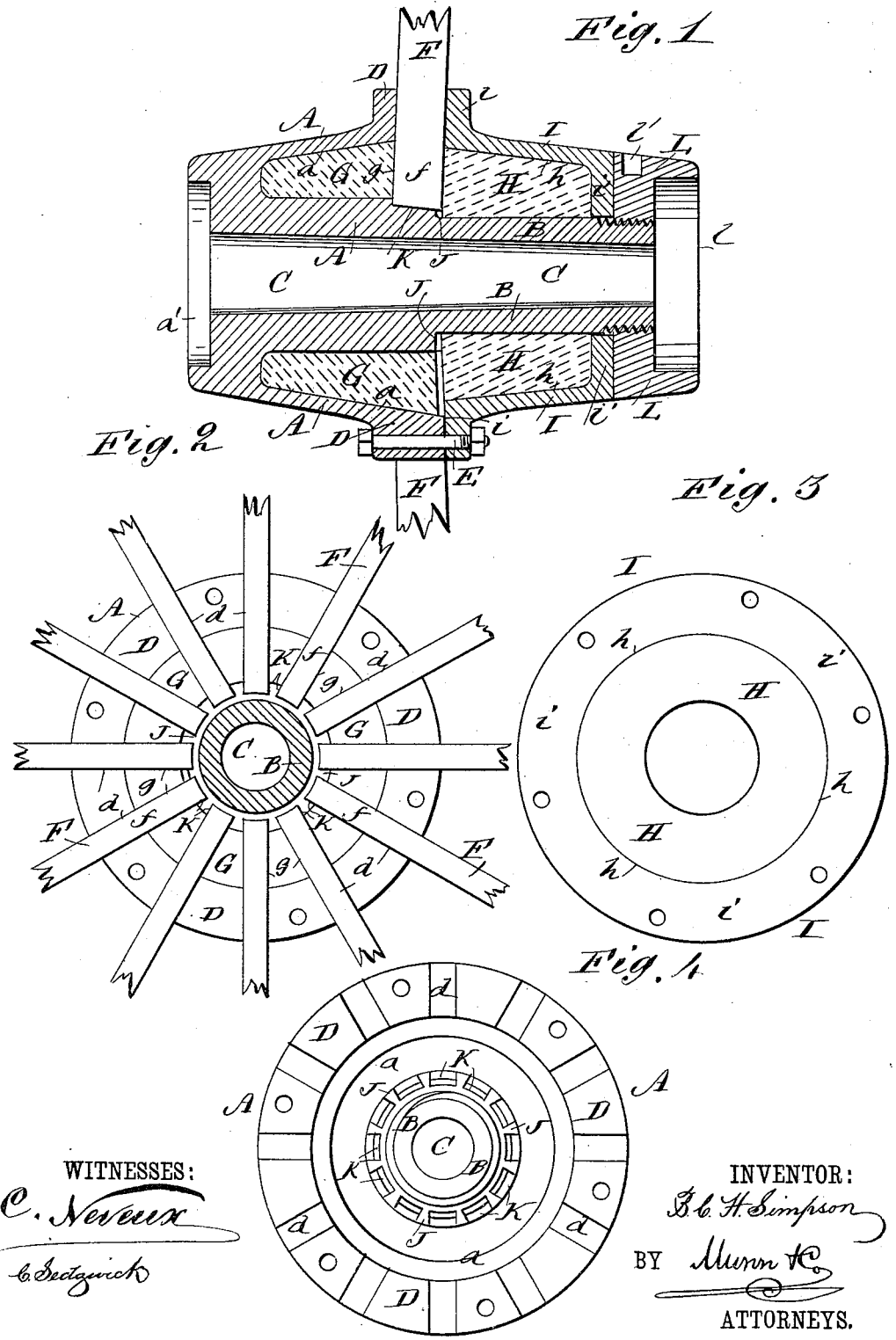

UNITED STATES PATENT OFFICE.

BURWELL C. H. SIMPSON, OF LEBANON, TENNESSEE.

VEHICLE-HUB.

SPECIFICATION forming part of Letters Patent No. 368,358, dated August 16, 1887.

Application filed April 2, 1887. Serial No. 233,416. (No model.)

*To all whom it may concern:*

Be it known that I, BURWELL C. H. SIMPSON, of Lebanon, in the county of Wilson and State of Tennessee, have invented a new and useful Improvement in Vehicle-Wheels, of which the following is a full, clear, and exact description.

My invention relates to vehicle-wheels, and more particularly to the hub of the wheel, and has for its object to provide a simple, inexpensive, and durable wheel, the spokes of which will be clamped securely to place, and so as to allow renewal of either the spokes or felly-sections should they be damaged or broken, and constructed also to allow tightening of the tire by expansion of the felly-sections by endwise thrust of the spokes when wedged outward from the hub.

The invention consists in certain novel features of construction and combinations of parts of the vehicle-wheel, all as hereinafter described and claimed.

Reference is to be had to the accompanying drawings, forming a part of this specification, in which similar letters of reference indicate corresponding parts in all the figures.

Figure 1 is a longitudinal central sectional elevation of the wheel-hub with parts of opposite spokes fitted therein. Fig. 2 is a face view of the inner part or half of the hub with the inner ends of the spokes set therein and the axle-box in cross-section. Fig. 3 is an inside face view of the outer detachable portion of the wheel-hub, and Fig. 4 is an outer face view of the inner part of the wheel-hub with the spokes and clamp-block removed.

The inner part, A, of the wheel-hub has an outward central prolongation, B, which, with the part A, is bored through at C, to form a box to receive the axle, which is not shown, but may have any approved construction. The hub part A has the usual annular socket, $a'$, to receive a collar on the axle, and is provided with an annular peripheral flange, D, to receive clamping-bolts E, by which the inner ends, $f$, of the wheel-spokes F are clamped to place by the aid of opposite wooden blocks, G H, fitted, respectively, in the inner and outer parts, A I, of the wheel-hub, as presently explained.

The clamp-block G is fitted to an annular recess, $a$, made in the part A of the hub from its outer face, and the clamp-block H is fitted to an annular recess, $h$, made within the metal part I of the hub and between it and the hub prolongation B, said part I having a peripheral flange, $i$, through which the bolts E pass. The prolongation B of the hub part A is smaller in diameter than the inner wall or side of the clamp-block recess $a$, thereby providing a shoulder at J, next which the inner wall of the recess is preferably notched radially at K to receive the inner extremities of the spokes, and the bases of these notches K preferably slope toward the shoulder J, and are sufficiently beyond or outside of the outer surface of the prolongation B to give room for the swinging outward of the dished spokes from the part A of the hub. In other words, if the inner ends of the spokes of a dished wheel were abutted on a surface level or in line with the outer face of the prolongation B of the hub, it would be impossible to withdraw the spokes from the hub while they were held in the felly of the wheel; but this is allowed by the shouldered construction at J, above described.

It will be noticed that the inner parts of the spokes—which are of equal size throughout where they enter the hub—are fitted into radial notches $d$ in the face of the flange D, and in coinciding radial notches $g$ in the face of the clamp-block G; hence it is not essential that the inner extremities of the spokes be fitted into notches K at the shoulder J, as the spokes would be securely held laterally by or within the notches $d\,g$, and could be withdrawn easily from the hub part A were their inner ends rested directly on the inner wall of the clamp-block socket $a$ next the shoulder J; but the construction with the notches K is preferred in practice, as it relieves the wooden clamp-block G from splitting strains to which it otherwise might be subjected. The outer face of the block G preferably stands back a little from the outer faces of the spokes to allow the opposite clamp-block, H, to have a fair bearing and proper clamping action on the outer faces of the ends of the spokes when the bolts E are tightened.

The outer end, $i'$, of the outer metal part, I, of the hub is centrally apertured to fit around the axle-box prolongation B, and the latter is screw-threaded at its outer end, which projects beyond the part I to receive a clamping-nut, L, which preferably has an outer face-socket, *l*, to receive the axle-retaining nut, and also has an aperture, *l'*, in which to put a wrench-bar for turning the nut up tightly to place against the part or cap-plate I, binding all parts of the hub securely together, as shown in Fig. 1 of the drawings.

It is obvious that the outer metal portions of the hub protect the inner wooden cores or spoke clamp-blocks, G H, from the weather, and as the clamp-blocks cannot turn in their metal casings or shells they are not subject to wear, while their strong pressure against the spokes will hold the spokes securely and prevent shaking of them in the hub, whereby the durability of the entire wheel will be promoted. Furthermore, the construction of the wheel-hub readily admits of tightening the tire without cutting it, as this may be done by unscrewing the nut L and taking out the bolts E and removing the outer part, I H, of the hub and driving wedges between the extremities of the spokes and the metal axle-box of the hub, which will force the spokes outward and expand the felly against the tire to tighten it perfectly, and this may be done at any time and without the aid of a wheelwright, or without removing the wheel from its axle, and finally any broken part of the wheel—such as a spoke or a felly-section—may be readily removed and replaced by a new duplicate part at any time required.

I am not limited to the use of cores or clamp-blocks G H made of wood, as rubber or composition blocks may be employed, the object being to provide a core or clamp-block of a softer material than the outer metal casings or parts of the hub, and which will have a tendency to yield a little to pressure, and thereby make a very close fit around the inner parts of the spokes when the hub-sections are bolted together; but I wish it to be understood that having found wooden clamp-blocks are very useful for this purpose, and withal quite inexpensive, I make special claim to clamp-blocks of this material, in combination with the metallic hub-sections and the spokes.

Having thus described my invention, what I claim as new, and desire to secure by Letters Patent, is—

1. The combination, in a wheel, of a metal hub-section, A, having a prolongation, B, and bored at C, and having a socket, *a*, and face-notches *d*, receiving the inner ends of the spokes, an outer metal cap-plate, I, fitted around the part B, and providing a socket, *h*, spoke clamp-blocks G H, fitted in the sockets *a h*, respectively, bolts E, binding the parts A I together, and an outer clamping-nut, L, fitted to the part B at the outer end of the axle-box, substantially as herein set forth.

2. A wheel made with an inner hub-section, A, having an internal shoulder providing a surface above or outside of the periphery of the part forming the axle-box for the inner ends of the spokes to rest upon, substantially as shown and described, whereby when the outer detachable portion of the hub is removed the dished spokes may be easily removed from their seats in the part A of the hub, as and for the purposes set forth.

3. A wheel made with an inner hub-section, A, having a prolongation, B, and a socket, *a*, the inner wall of which socket stands above or outside of the outer surface of the part B, providing a shoulder, J, a clamp-block, G, fitted in the socket *a*, and said parts A G notched at *d g*, respectively, to receive the inner ends of the spokes which abut the inner wall of the socket *a* next the shoulder J and outside of the part B, substantially as described, for the purposes set forth.

4. A wheel made with an inner hub-section, A, having a prolongation, B, and a socket, *a*, the inner wall of which stands above or outside of the part B, and is provided with notches K next a shoulder, J, formed at the inner end of part B, a clamp-block, G, fitted in the socket *a*, and said parts A G notched at *d g*, respectively, to receive the inner parts of the spokes whose extremities enter the notches K and stand above or outside of the part B, substantially as shown and described, whereby the clamp-block will be relieved of lateral strains and the dished spokes may be removed when the outer detachable part of the hub is removed, as and for the purposes herein set forth.

5. A wheel constructed, substantially as herein shown and described, with a metal part, A, having a prolongation, B, a socket, *a*, and a shoulder, J, and notches *d* K, and bored at C to form an axle-box, a clamp-block, G, notched at *g* and fitted to the socket *a*, spokes F, fitted to the notches *d* K *g* of the parts A G, an outer metal part, I, fitted around the part B and providing with it a socket, *h*, a clamp-block, H, fitted in the socket *h*, and a nut, L, fitted to the threaded end of the part B, as and for the purposes herein set forth.

BURWELL C. H. SIMPSON.

Witnesses:
J. B. TOLLIVER,
N. TOLLIVER.